US009135177B2

(12) United States Patent
Biswas et al.

(10) Patent No.: US 9,135,177 B2
(45) Date of Patent: Sep. 15, 2015

(54) SCHEME TO ESCALATE REQUESTS WITH ADDRESS CONFLICTS

(71) Applicant: Apple Inc., Cupertino, CA (US)

(72) Inventors: Sukalpa Biswas, Fremont, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/777,777

(22) Filed: Feb. 26, 2013

(65) Prior Publication Data

US 2014/0244920 A1    Aug. 28, 2014

(51) Int. Cl.
G06F 12/00    (2006.01)
G06F 12/08    (2006.01)
G06F 13/16    (2006.01)

(52) U.S. Cl.
CPC .......... *G06F 12/084* (2013.01); *G06F 12/0859* (2013.01); *G06F 13/16* (2013.01); *G06F 2212/304* (2013.01)

(58) Field of Classification Search
CPC .... G06F 12/084; G06F 12/0859; G06F 13/16
USPC .................. 711/104, 122, 140, 146
See application file for complete search history.

(56) References Cited

U.S. PATENT DOCUMENTS

| 5,875,472 | A | 2/1999 | Bauman et al. | |
|---|---|---|---|---|
| 6,081,873 | A | 6/2000 | Hetherington et al. | |
| 8,190,820 | B2 | 5/2012 | Thantry et al. | |
| 8,493,863 | B2 * | 7/2013 | Saund et al. | 370/235 |
| 2004/0081093 | A1 * | 4/2004 | Haddock et al. | 370/230 |
| 2007/0011396 | A1 * | 1/2007 | Singh et al. | 711/105 |
| 2012/0079245 | A1 | 3/2012 | Wang et al. | |
| 2012/0221796 | A1 | 8/2012 | Tran | |
| 2013/0031313 | A1 * | 1/2013 | Ryan et al. | 711/137 |
| 2013/0132682 | A1 * | 5/2013 | Kassoff | 711/143 |
| 2013/0173860 | A1 * | 7/2013 | Comparan et al. | 711/122 |

\* cited by examiner

*Primary Examiner* — Reba I Elmore
(74) *Attorney, Agent, or Firm* — Rory D. Rankin; Meyertons, Hood, Kivlin, Kowert & Goetzel, P.C.

(57) ABSTRACT

Techniques for escalating a real time agent's request that has an address conflict with a best effort agent's request. A best effort request can be allocated in a memory controller cache but can progress slowly in the memory system due to its low priority. Therefore, when a real time request has an address conflict with an older best effort request, the best effort request can be escalated if it is still pending when the real time request is received at the memory controller cache. Escalating the best effort request can include setting the push attribute of the best effort request or sending another request with a push attribute to bypass or push the best effort request.

20 Claims, 10 Drawing Sheets

SCHEME TO ESCALATE REQUESTS WITH ADDRESS CONFLICTS

BACKGROUND

1. Field of the Invention

The present invention relates generally to data flow in an integrated circuit, and in particular to methods and mechanisms for handling address conflicts between memory requests in a system cache located in a memory controller.

2. Description of the Related Art

Modern day mobile electronic devices often include multiple components or agents sharing access to one or more memory devices. A memory controller may be coupled to the memory device(s), and the multiple components and/or agents may access the memory device(s) via the memory controller. The memory controller may include a system cache for storing data to reduce the number of memory requests that have to access off-chip memory.

The various agents within an electronic device may make large numbers of requests to memory, and from time to time, two or more outstanding requests will target the same address, resulting in an address conflict between the requests. In some cases, a best effort agent, such as a scaler, may produce data for a real time agent such as a display. For example, a given best effort read request may be allocated in the system cache but may progress slowly in the memory system due to its low priority. If a real-time read request is received at the system cache, and the real-time read request has an address conflict with the given best effort read request, the slow progress of the best effort read request can cause an underflow issue.

SUMMARY

Systems, memory controllers, caches, and methods for processing requests with address conflicts are disclosed. In a system on chip, multiple agents may be coupled to a memory controller which in turn may be coupled to one or more memory devices. The multiple agents may access the memory device(s) via the memory controller. The memory controller may include a system cache configured to store data for the purposes of reducing the number of requests that access off-chip memory. The memory controller may also include a memory controller switch and multiple memory channel units. The system cache may include a miss queue for storing entries corresponding to requests that miss the system cache. The requests may be sent out of the miss queue to memory via a memory controller switch and a memory channel unit.

In one embodiment, a request with a real-time QoS attribute may be generated by a real-time agent and sent to the memory controller and routed to the system cache. The miss queue may be searched for any entries corresponding to outstanding requests that have address conflicts with the new request. In one scenario, the real-time request may hit in the miss queue on an entry for a previous request that is still outstanding. The previous request may have a best effort QoS attribute and may have been generated by a best effort agent.

For this scenario, a variety of different techniques may be utilized to expedite the retrieval of data from the shared address. The specific technique that is utilized may depend on the status of the pending best effort request, as in how far along in the path to memory the best effort request has traveled. If the best effort request has not yet been sent to the memory controller switch, then the best effort request may have its push attribute set and may be escalated going forward through the memory controller switch and a corresponding memory channel unit.

If the best effort request has already been sent to the memory controller switch, then the entry stored in the miss queue corresponding to the best effort request may have its push attribute set. If the best effort request has already been sent to the memory controller switch, however, it may be too late to escalate the best effort request. Therefore, a second request with a push attribute and the same QoS level as the real-time request may be enqueued in the miss queue. The second request will attempt to bypass the best effort request in the memory controller switch or push the best effort request in the corresponding memory channel unit.

If the real-time request misses in the miss queue and hits in the tag memory on an entry with a data pending state, then a second request with a push attribute and the same QoS level as the best effort request may be generated and an entry for the second request enqueued in the miss queue. The second request will attempt to bypass the best effort request in the memory controller switch or push the best effort request in the corresponding memory channel unit.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
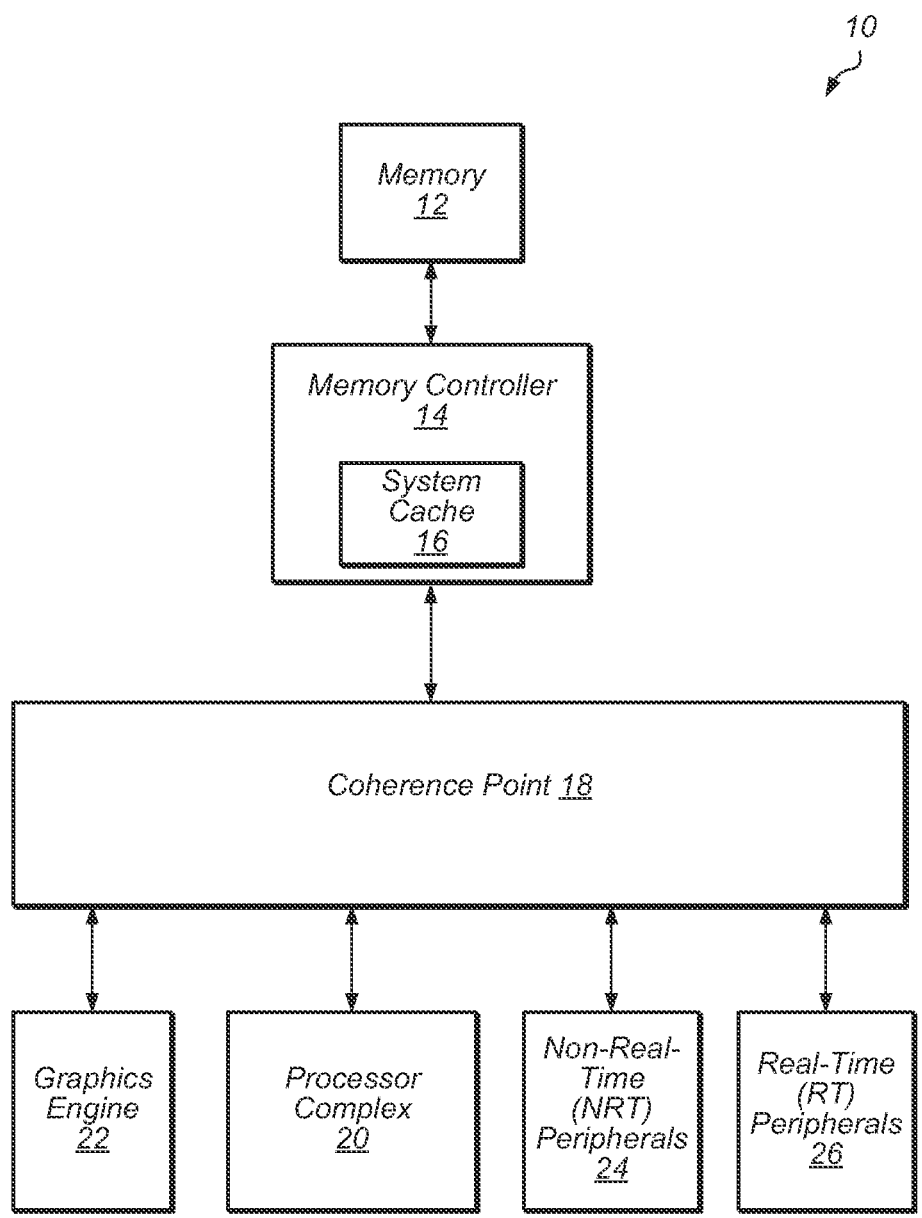
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system cache receiving a plurality of requests, the terms "first" and "second" requests can be used to refer to any two of the plurality of requests.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. As a result of processing requests with data stored in system cache 16, the number of accesses that are made to memory 12 may be reduced, which reduces the latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS from Apple™). Each of the CPUs may include a level one (L1) cache, and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
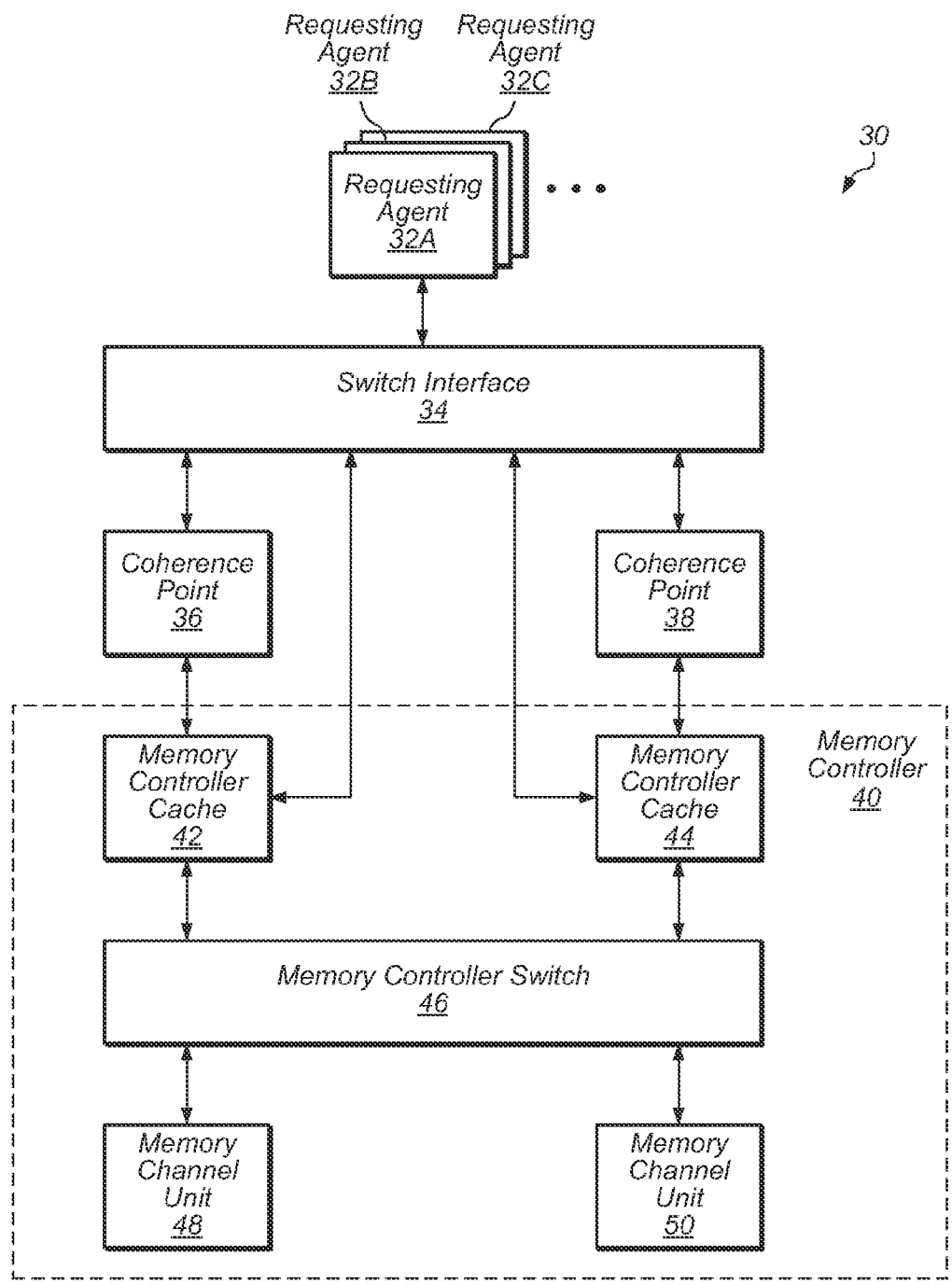
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherence point 36 and memory requests that reference the address space of cache 44 may be routed by switch interface 34 to cache 44 via coherence point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller switch 46 may route traffic between memory controller caches 42 and 44 and memory channel units 48 and 50. Memory controller switch 46 may include a variety of logical units, including one or more out-of-order queues (not shown) for temporarily storing received read requests. There may be one memory channel unit 48 and 50 for each memory channel included in a given embodiment, and other embodiments may include one channel or more than two channels. The memory channel units 48 and 50 may be configured to schedule memory operations to be transmitted on the memory channel. Each of memory channel units 48 and 50 may include multiple pre-sorting queues to store memory operations and out of which the memory operations may be scheduled. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
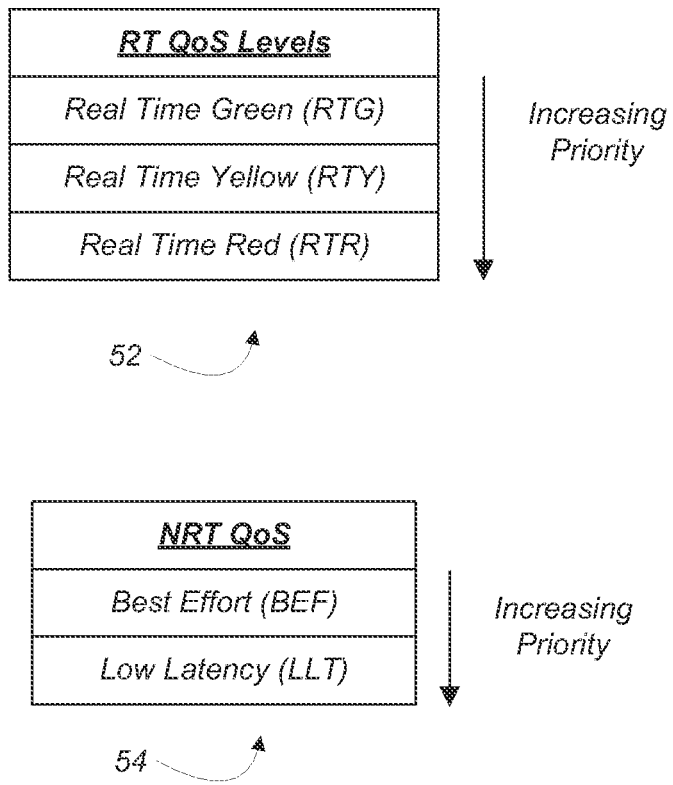
FIG. 3 illustrates two tables defining two sets of QoS levels.

Referring now to FIG. 3, two tables are shown illustrating definitions of two sets of QoS levels for one embodiment. Other embodiments may include additional or substitute levels, and other embodiments may include additional levels in combination with a subset of the illustrated levels. As illustrated by the arrows pointing downward next to the tables 52 and 54 illustrates the QoS levels within a set in increasing priority. That is, the real time green (RTG) QoS level is the lowest priority RT QoS level, the real time yellow (RTY) QoS level is the medium priority RT QoS level, and the real time red (RTR) QoS level is the highest priority RT QoS level. A source may assign a QoS level to a given transaction based on the priority of the given transaction. Similarly, the best effort (BEF) QoS level is the lowest priority non-real-time (NRT) QoS level and the low latency (LLT) QoS level is the highest priority NRT QoS level.

The RTG, RTY, and RTR QoS levels may reflect relative levels of urgency from an RT source. That is, as the amount of time before data is needed by the RT source to prevent erroneous operation decreases, the QoS level assigned to each transaction increases to indicate the higher urgency. By treating transactions having higher urgency with higher priority, data may be returned to the RT source more quickly and may thus aid the correct operation of the RT source.

For example, a display pipe may initiate the reading of frame data from memory for the next frame to be displayed in the vertical blanking interval for the display. The frame is not actually displayed until the end of the vertical blanking interval, and thus the display pipe may use the RTG level during this time period. As the frame begins to be displayed (i.e. the display controller begins reading frame pixels from the display pipe output), the display pipe may raise the QoS level of frame data read operations to the memory to the RTY level. For example, if the amount of frame data that is read ahead of the current pixel being displayed reduces below a first threshold, the level may be raised to RTY. At a second threshold (lower than the first threshold), the display pipe may raise the QoS level of memory operations to RTR.

The BEF NRT QoS level may be a request to return the data as quickly as the memory controller is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller.

Transactions may be escalated from a low QoS level to a higher QoS level based on a variety of criteria or triggers. For example, a given transaction may be assigned a BEF QoS level, and the transaction may be received by a memory controller (not shown). If a tag lookup for the transaction misses in the system cache, then an entry may be stored in the miss queue for the transaction, and then the transaction may proceed to memory. A subsequent transaction with a higher priority may be received by the memory controller, and the subsequent transaction may have an address conflict with the BEF transaction. If the BEF transaction has not yet been sent to the memory controller switch when the subsequent transaction is received, then the BEF transaction may have its push bit set before being sent to the switch. As a result, the BEF transaction may be treated as if it had a higher QoS level by the various arbiters along the path to memory. If the BEF transaction has already been sent to the memory controller switch, then the subsequent transaction may have its push bit set and be sent along the path to memory with the intent to bypass the BEF transaction or push the BEF transaction. If the subsequent transaction overtakes the BEF transaction along the path to memory, then the QoS level of the BEF transaction may be escalated to the QoS level of the subsequent transaction. This will cause the BEF transaction to be expedited for the remainder of the path to memory. In general, a transaction may be upgraded to a higher QoS level if a subsequent transaction with a higher QoS level has an address conflict with the earlier transaction and the earlier transaction has not yet been completed.

It will be understood that the QoS levels shown in tables 52 and 54 of FIG. 3 are merely illustrative and should not be construed as implying any limitations upon the scope of the methods and mechanisms described herein. While the rest of this disclosure will be described in terms of transactions being assigned QoS levels from the tables 52 and 54 it is to be understood that other QoS levels may be employed in other embodiments. Other embodiments may implement other types of QoS schemes with more or fewer QoS levels. Furthermore, other embodiments may represent the different QoS levels with designators other than colors (for real-time) and with designators other than best effort and low latency (for non-real-time).

Figure 4:
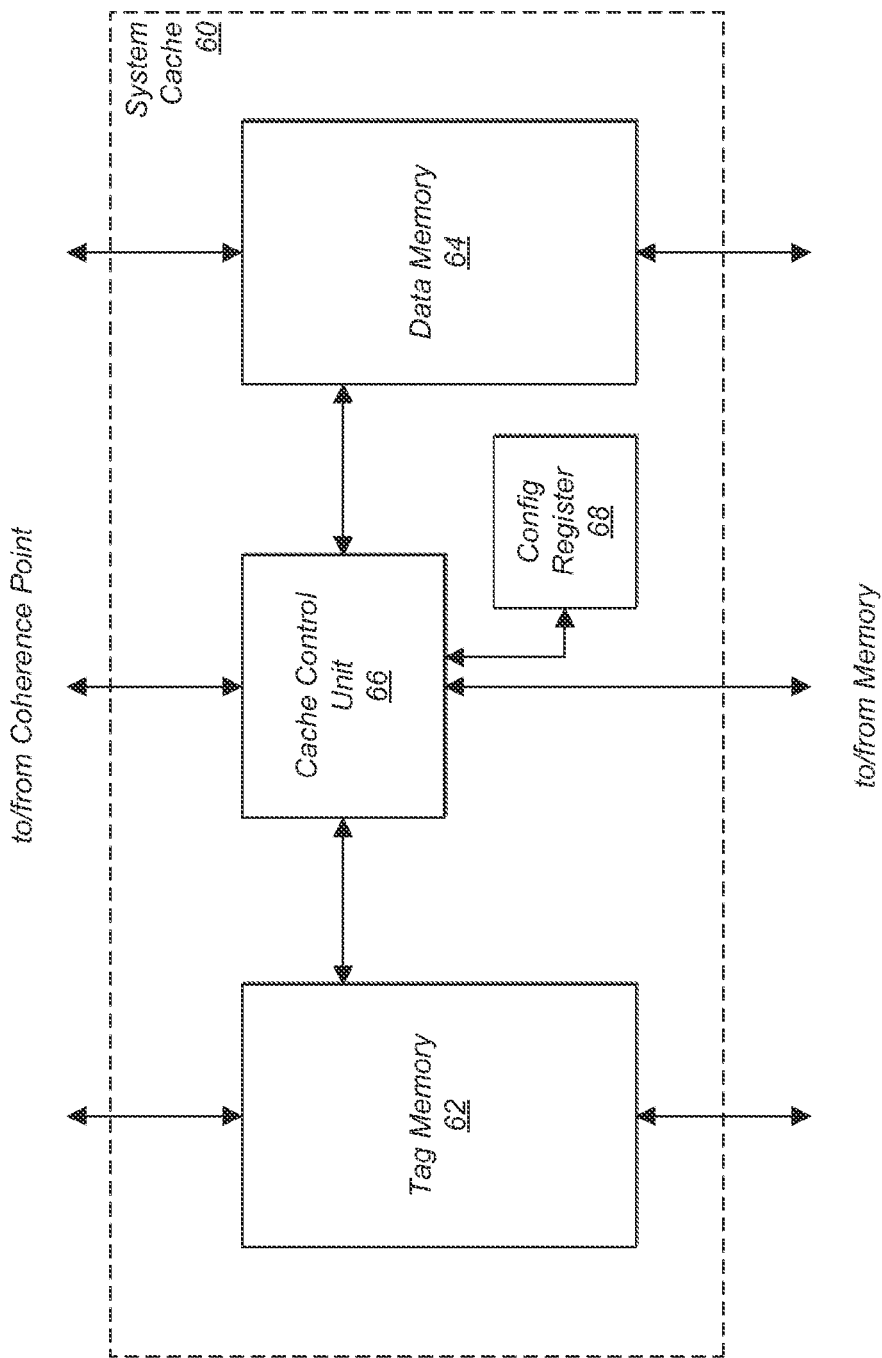
FIG. 4 is a block diagram illustrating one embodiment of a system cache.

Referring now to FIG. 4, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 4. For example, in other embodiments, system cache 60 may include arbitration circuitry to arbitrate among requests, a miss queue, a replay buffer, and other units. It is to be understood that the system cache architecture shown in FIG. 4 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 4 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and replacement policy for a respective group ID.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

Figure 5:
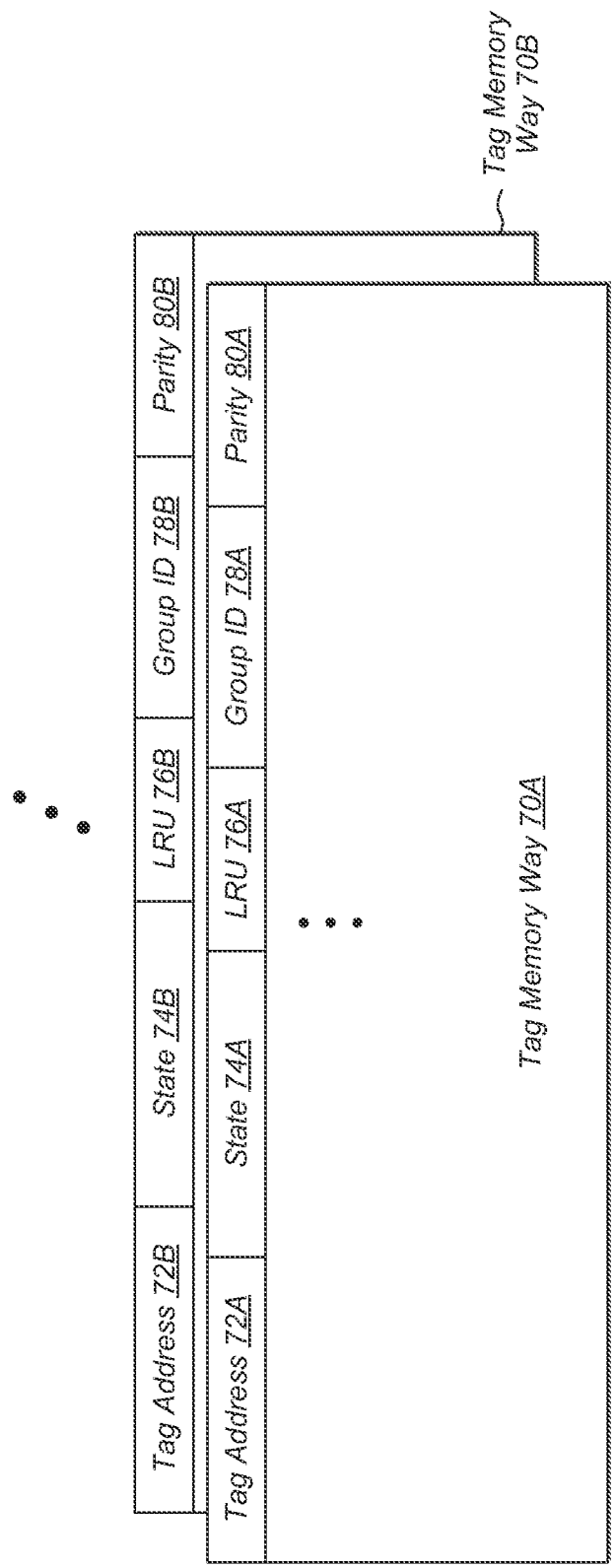
FIG. 5 is a block diagram illustrating one embodiment of a pair of tag memory ways.

Turning now to FIG. 5, a block diagram of one embodiment of a pair of tag memory ways is shown. Tag memory ways 70A-B are representative of any number of ways that may be included within a tag memory, such as tag memory 62 (of FIG. 4). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The clean/dirty status of a cache line may be conveyed along with the transaction to the system cache by the requesting agent. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 5. For example, information about how recently the cache line was replaced may also be stored in each tag of tag memory ways 70A-B. Also, in other embodiments, tag memory ways 70A-B may be structured in any other suitable manner.

Figure 6:
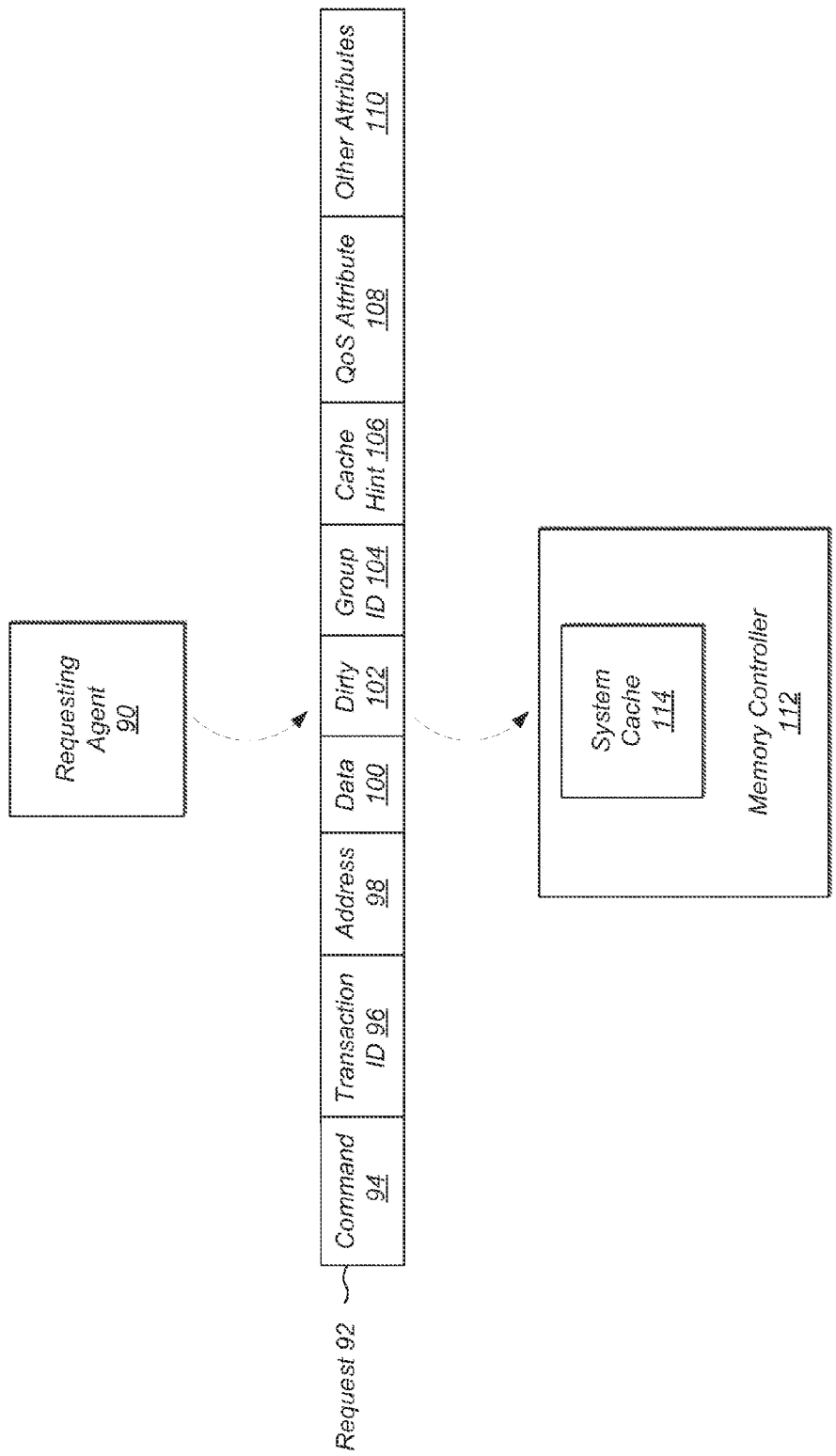
FIG. 6 illustrates one embodiment of a requesting agent conveying a request to a system cache.

Referring now to FIG. 6, one embodiment of a requesting agent conveying a request to a system cache is shown. Requesting agent 90 is representative of any number and type of requesting agents. Although requesting agent 90 is shown as sending request 92 directly to memory controller 112, it is noted that one or more components (e.g., coherent point, switch) may be located between requesting agent 90 and memory controller 112.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 114. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 114. QoS attribute 108 may indicate the priority level of request 92 and determine how request 92 is processed in relation to other requests. In one embodiment, QoS attribute 108 may include a real-time or non-real-time attribute and/or a color indicative of the level within the real-time or non-real-time domains. Also, in some embodiments, QoS attribute 108 may include a push attribute as part of the overall QoS attribute field. For example, in one embodiment, QoS attribute 108 may be represented with a four-bit field, with one bit indicating a push status and three bits indicating the QoS attribute. Other attributes 110 are representative of any number and type of additional attributes (e.g., coherency, size of the request, requestor ID, speculative status) which may be part of request 92. It is noted that in other embodiments, request 92 may be structured differently, with one or more additional fields not shown in FIG. 6 and/or one or more of the fields shown omitted.

Although system cache 114 is shown as a single unit, it should be understood that in other embodiments, system cache 114 may be split up into two or more separate units. For example, in another embodiment, memory controller 112 may include two channels and system cache 114 may be split up into two separate physical system caches. In this embodiment, the two separate physical system caches may be managed as one logical system cache.

Figure 7:
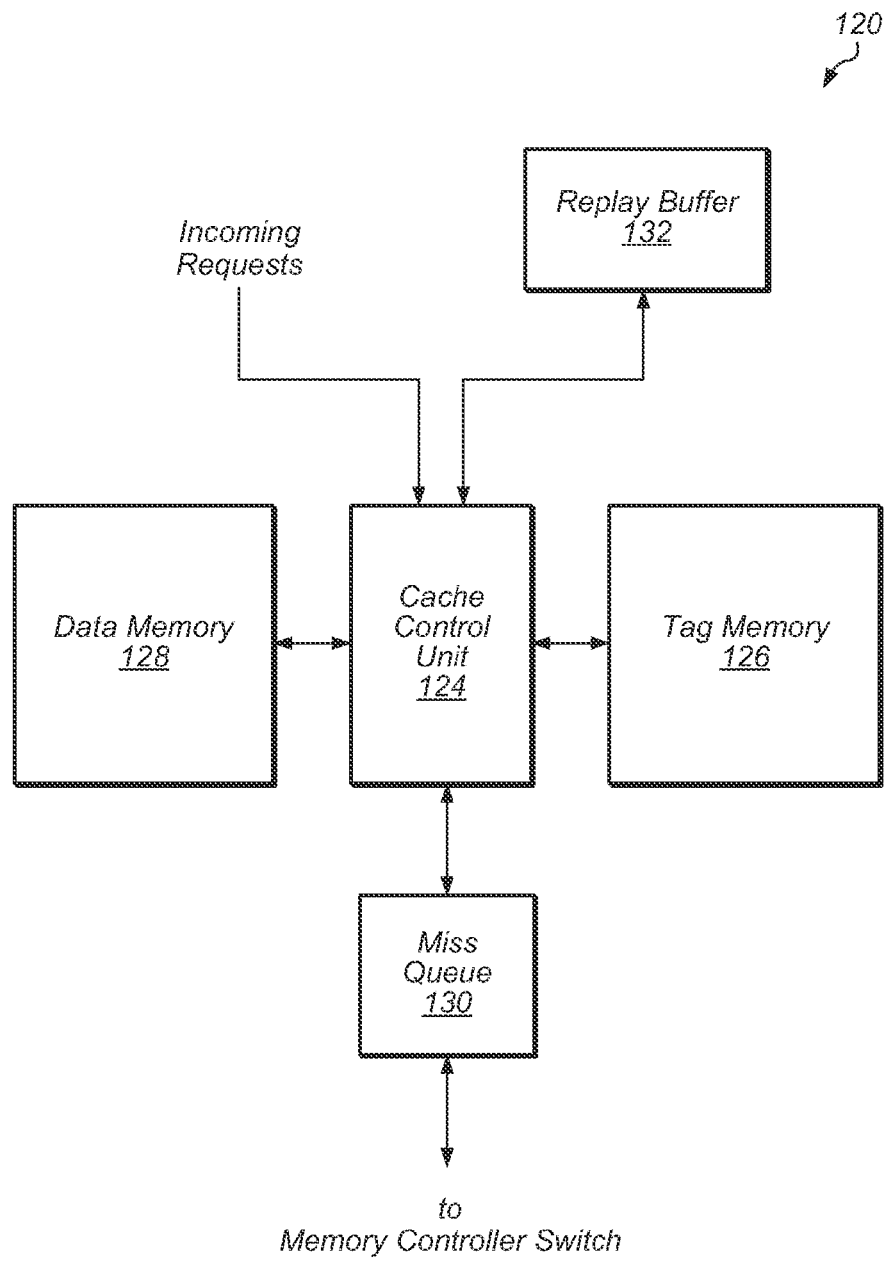
FIG. 7 is a block diagram illustrating another embodiment of a system cache.

Turning now to FIG. 7, a block diagram of another embodiment of a system cache is shown. System cache 120 may include cache control unit 124, tag memory 126, data memory 128, miss queue 130, and replay buffer 132. It is noted that there may be additional units and signal connections within system cache 120 that are not shown to avoid cluttering the figure. Requests that reference memory may be generated by various requesting agents and conveyed to cache control unit 124 of system cache 120. Cache control unit 124 may perform a tag lookup of tag memory 126 to determine if the data at the memory address referenced by an incoming request is stored in data memory 128. Cache control unit 124 may also perform a lookup of miss queue 130 to determine if the incoming request has an address conflict with any of the pending requests with entries stored in miss queue 130.

If an incoming request has an address conflict with a previous, pending request, and the incoming request has a higher QoS level than the previous request, then various techniques may be utilized to expedite the processing of the previous request. An entry may be enqueued in miss queue 130 for the new request, and the push attribute of the entry may be set. A new request with a push attribute may be generated and sent to the memory controller switch and try to push or bypass the previous request on the path to memory. In one embodiment, the new request may have a cache hint of do not allocate.

If an incoming request hits in tag memory 126 on an entry in a data pending state, and if the incoming request has a higher QoS level than the request corresponding to the hit entry, then an entry may be enqueued in miss queue 130 for the new request, and the push attribute of the miss queue entry may be set. Also, a separate request may be sent to the memory controller switch and try to push or bypass the previous request on the path to memory. The separate request may have the push attribute and the same QoS level as the original incoming request. Additionally, the original incoming request may be stored in replay buffer 132 and wait until the fill comes back from memory for the entry in the data pending state, at which point the original request may be woken up and replayed from the replay buffer 132.

Figure 8:
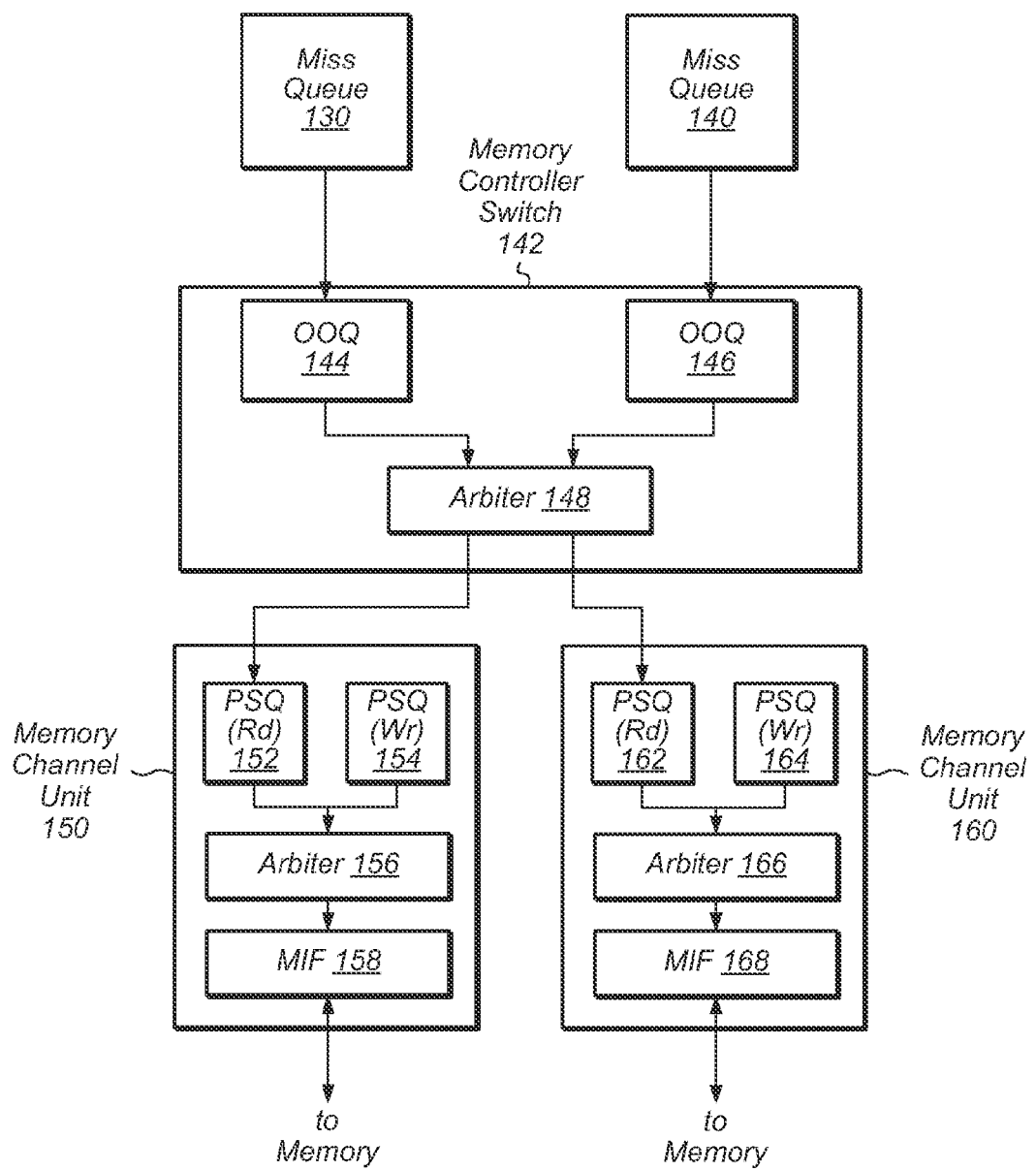
FIG. 8 is a block diagram illustrating an embodiment of a portion of a memory controller.

Referring now to FIG. 8, a block diagram of a portion of a memory controller is shown. The portion of the memory controller shown in FIG. 8 includes the units utilized for handling read request traffic from the system cache. In one embodiment, the techniques described herein for escalating requests with address conflicts may only apply to read requests and to read after read (RAR) hazards. In other embodiments, the techniques described herein for escalating requests with address conflicts may apply to both read and write requests. While the illustration shown in FIG. 8 will be described in terms of address conflicts between read requests, it is to be understood that other embodiments may employ similar techniques for resolving address conflicts between write requests and write and read requests.

Miss queues 130 and 140 may be coupled to out-of-order queues (OOQs) 144 and 146, respectively. Miss queue 130 may be located within a first system cache (not shown) and miss queue 140 may be located within a second system cache (not shown). Read requests may be selected out of OOQs 144 and 146 by arbiter 148. Arbiter 148 may choose read requests out of OOQs 144 and 146 based at least in part on the QoS level of the requests and the status of the push attribute. If two read requests have an address conflict, and the younger read request has a higher priority than the older read request, then the younger read request may bypass the older read request within memory controller switch 142. It is noted that memory controller switch 142 may include additional logic for handling write request traffic which is not shown in FIG. 8 to avoid cluttering the figure. Although not shown in FIG. 8, write requests may be routed to either pre-sorting queue (PSQ) 154 or PSQ 164 based on the address of the given write request.

Arbiter 148 may convey read requests to either PSQ 152 of memory channel unit 150 or to PSQ 162 of memory channel unit 160 based on the addresses of the read requests. Arbiter 156 may choose between requests in PSQ 152 and PSQ 154 for sending to memory interface unit (MIF) 158 based at least in part on the QoS level of the requests and the status of the push attribute. Similarly, arbiter 166 may choose between requests in PSQ 162 and PSQ 164 for sending to MIF 168 based at least in part on the QoS level of the requests and the status of the push attribute. For two read requests with an address conflict, if the newer read request catches up to the older read request, the newer read request may push the older request in the given PSQ. The older request may then be expedited going forward through the corresponding MIF.

Figure 9:
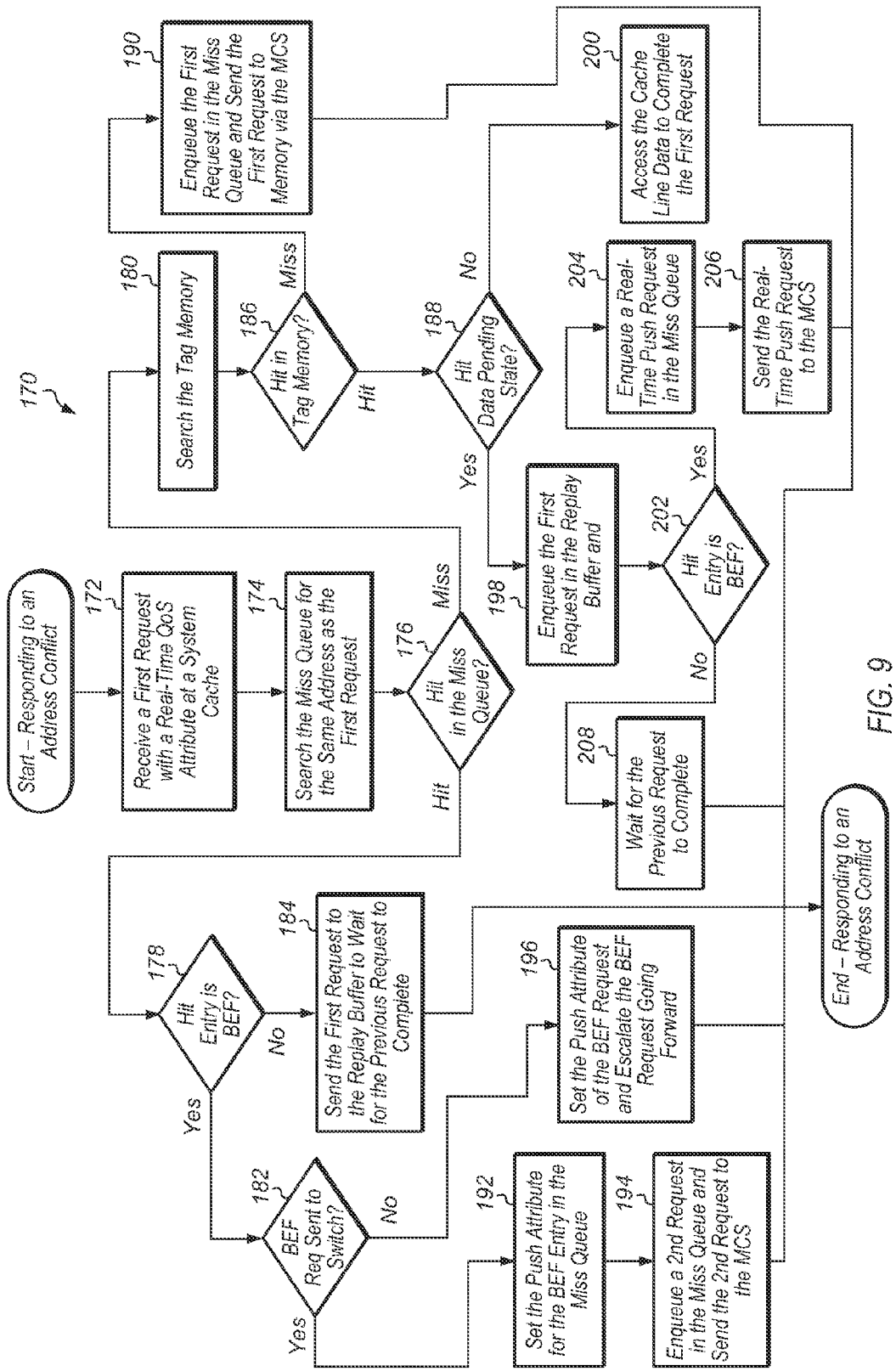
FIG. 9 is a generalized flow diagram illustrating one embodiment of a method for responding to an address conflict.

Referring now to FIG. 9, one embodiment of a method 170 for responding to an address conflict is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a first request with a real-time QoS attribute may be received by a system cache (block 172). Next, the miss queue may be searched for other pending requests to the same address as the first request (block 174). If the first request hits in the miss queue (conditional block 176, "hit" leg), then it may be determined if the hit entry in the miss queue corresponds to a best effort request (conditional block 178). If the first request misses in the miss queue (conditional block 176, "miss" leg), then the tag memory may be searched for the address of the first request (block 180). It is noted that in some embodiments, the tag memory may be searched prior to the miss queue being searched, or alternatively, the tag memory and miss queue may be searched simultaneously.

If the hit entry in the miss queue corresponds to a best effort request (conditional block 178, "yes" leg), then it may be determined if this best effort request has already been sent to the memory controller switch (conditional block 182). If the hit entry in the miss queue does not correspond to a best effort request (conditional block 178, "no" leg), then the first request may be sent to the replay buffer to wait for the previous real-time request to complete (block 184).

After block 180, if there is a hit in the tag memory for the address of the first request (conditional block 186, "hit" leg), then it may be determined if the hit entry is in a data pending state (conditional block 188). If there is a miss in the tag memory for the address of the first request (conditional block 186, "miss" leg), then a cache line storage location may be allocated for the first request, the state of the cache line storage location may be set to the data pending state, an entry may be enqueued in the miss queue for the first request, and the first request may be sent along the path to memory via the memory controller switch (block 190).

If it is determined that the best effort request has already been sent to the memory controller switch (conditional block 182, "yes" leg), then the entry for the best effort request in the miss queue may have its push attribute set (block 192). If the best effort request has already been sent to the memory controller switch, it is too late to escalate this request, but an entry may be enqueued in the miss queue for a second request, and the second request may be sent to the memory controller switch (MCS) with a push attribute and the same real-time QoS level as the first request (block 194). If it is determined that the pending best effort request has not been sent to the memory controller switch (conditional block 182, "no" leg), then the best effort request may have its push attribute set and may be escalated going forward (block 196).

If it is determined that the hit entry is in a data pending state (conditional block 188, "yes" leg), then the first request may be enqueued in the replay buffer (block 198). If it is determined that the hit entry is not in a data pending state (conditional block 188, "no" leg), then the first request may access the corresponding cache line data to complete the first request (block 200).

After block 198, if it is determined that the hit entry corresponds to a previous request with a best effort QoS level (conditional block 202, "yes" leg), then the tag pipeline may enqueue a real-time push request into the miss queue (block 204). The real-time push request may be sent to the memory controller switch (MCS) with the original real-time color (block 206). The real-time push request will attempt to bypass the best effort request in the memory controller switch or push the best effort request in the memory channel unit, depending on the location where the first request overtakes the best effort request.

If it is determined that the hit entry does not correspond to a previous request with a best effort QoS level (conditional block 202, "no" leg), then the first request may wait for the previous request to complete (block 208). After blocks 184, 190, 194, 196, 200, 206, and 208, method 170 may end.

Figure 10:
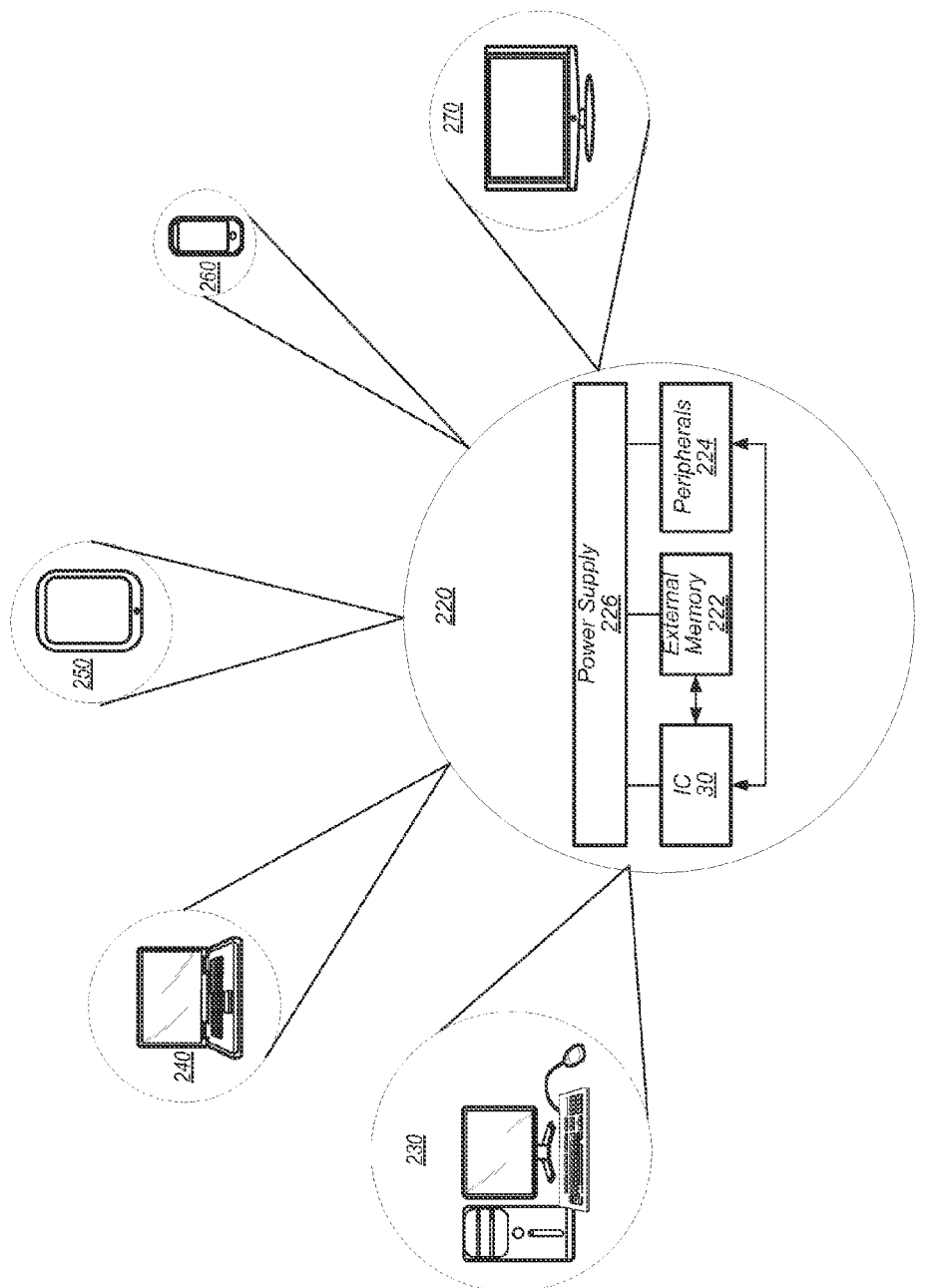
FIG. 10 is a block diagram of one embodiment of a system.

Referring next to FIG. 10, a block diagram of one embodiment of a system 220 is shown. As shown, system 220 may represent chip, circuitry, components, etc., of a desktop computer 230, laptop computer 240, tablet computer 250, cell phone 260, television 270 (or set top box configured to be coupled to a television), or otherwise. Other devices are possible and are contemplated. In the illustrated embodiment, the system 220 includes at least one instance of IC 30 (of FIG. 2) coupled to an external memory 222.

IC 30 is coupled to one or more peripherals 224 and the external memory 222. A power supply 226 is also provided which supplies the supply voltages to IC 30 as well as one or more supply voltages to the memory 222 and/or the peripherals 224. In various embodiments, power supply 226 may represent a battery (e.g., a rechargeable battery in a smart phone, laptop or tablet computer). In some embodiments, more than one instance of IC 30 may be included (and more than one external memory 222 may be included as well).

The memory 222 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 224 may include any desired circuitry, depending on the type of system 220. For example, in one embodiment, peripherals 224 may include devices for various types of wireless communication, such as wifi, Bluetooth, cellular, global positioning system, etc. The peripherals 224 may also include additional storage, including RAM storage, solid state storage, or disk storage. The peripherals 224 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory controller, wherein the memory controller comprises a system cache, a miss queue and a memory controller switch; and
a plurality of agents, wherein the plurality of agents are configured to generate requests which are conveyed to memory via the memory controller;
wherein the system cache is configured to:
detect an address conflict between a first request and a pending second request, wherein the second request is older than the first request, wherein the first request is generated by a first agent, wherein the second request is generated by a second agent, and wherein the first request has a higher quality of service (QoS) level than the second request; and
expedite retrieval of data corresponding to the address responsive to detecting the address conflict, wherein to expedite said retrieval the system cache is configured to:
generate a third request with a push attribute and a same QoS level as the first request, in response to detecting the second request has already been sent from the miss queue to the memory controller switch; and
enqueue the third request in the miss queue.

2. The system as recited in claim 1, wherein the system cache is configured to detect an address conflict when the first request hits a miss queue entry corresponding to the second request after performing a lookup of the miss queue.

3. The system as recited in claim 1, wherein the system cache comprises a tag memory, wherein the system cache is configured to detect an address conflict when the first request misses in the miss queue and hits an entry corresponding to the second request while performing a lookup of the tag memory, and wherein the entry is in a data pending state.

4. The system as recited in claim 3, wherein causing retrieval of data from the shared address of the address conflict to be expedited, the system cache is further configured to enqueue an entry with a push attribute in the miss queue for the first request.

5. The system as recited in claim 1, wherein the first request is a real-time request and wherein the second request is a non-real-time request.

6. The system as recited in claim 1, wherein causing retrieval of data from the shared address of the address conflict to be expedited comprises sending the third request to the memory controller switch, wherein the third request has a cache hint of do not allocate.

7. The system as recited in claim 6, wherein the third request with the same QoS level as the first request is configured to bypass the second request in the memory controller switch or push the second request in a memory channel unit.

8. A method comprising:
receiving a first request at a system cache, wherein the first request is a real-time request;
detecting a hit for the first request in a miss queue of the system cache, wherein the first request hits a first entry of the miss queue, and wherein the first entry corresponds to a pending best effort request; and
expediting retrieval of data corresponding to an address of the hit to the first entry responsive to detecting the hit to the first entry in the miss queue by the first request, wherein expediting comprises:
generating a second request with a push attribute and a same QoS level as the first request responsive to detecting the best effort request was already sent from the miss queue to the memory controller switch; and
enqueuing the second request in the miss queue.

9. The method as recited in claim 8, wherein the first request is generated by a first agent, and wherein the best effort request is generated by a second agent.

10. The method as recited in claim 9, wherein expediting retrieval of data from a shared address of the first request and best effort request comprises setting a push attribute of the first entry in the miss queue.

11. The method as recited in claim 10, wherein expediting retrieval of data from a shared address of the first request and best effort request further comprises sending the second request to a memory controller switch, wherein the second request has a cache hint of do not allocate.

12. The method as recited in claim 11, further comprising the second request with the same QoS level as the first request bypassing the best effort request in the memory controller switch.

13. The method as recited in claim 11, further comprising the second request pushing the best effort request in a memory channel unit.

14. The method as recited in claim 11, further comprising detecting a miss for the first request in the miss queue and detecting a hit on a first entry for the first request in a tag memory, wherein the first entry corresponds to the pending best effort request, and wherein the first entry in the tag memory is in a data pending state.

15. A memory controller comprising a system cache, wherein the system cache comprises:
a data memory configured to store a plurality of cache lines;
a tag memory configured to store a plurality of tags corresponding to the plurality of cache lines;
a miss queue configured to store entries corresponding to requests which miss a lookup of the tag memory; and
wherein the system cache is configured to:
detect an address conflict between a real-time request and a pending best effort request, wherein the best effort request is older than the real-time request, wherein the best effort request is generated by a first agent, and wherein the real-time request is generated by a second agent; and
expedite retrieval of data corresponding to the address responsive to detecting the address conflict between the real-time request and the pending best effort request, wherein to expedite said retrieval the system cache is configured to:
generate a third request with a push attribute and a same QoS level as the real-time request responsive to detecting the pending best effort request was already sent from the miss queue to the memory controller switch; and
enqueue the third request in the miss queue.

16. The memory controller as recited in claim 15, wherein detecting an address conflict between the real-time request and the best effort request comprises detecting a miss in the miss queue for the real-time request and detecting a hit for the real-time request in the tag memory for an entry in a data pending state, wherein the entry corresponds to the best effort request.

17. The memory controller as recited in claim 16, wherein the system cache is further configured to store the real-time request in a replay buffer responsive to detecting a hit for the real-time request in the tag memory for an entry in a data pending state.

18. The memory controller as recited in claim 17, wherein the system cache is configured to update a state of the entry to a clean state responsive to a cache line being retrieved from external memory, wherein the cache line corresponds to the best effort request.

19. The memory controller as recited in claim 18, wherein the system cache is configured to reactivate the real-time request in the replay buffer responsive to detecting the update of the state of the entry to the clean state.

20. The memory controller as recited in claim 15, wherein the data memory is a static random-access memory (SRAM).

\* \* \* \* \*